(12) United States Patent
Waehling et al.

(10) Patent No.: US 8,460,113 B2
(45) Date of Patent: Jun. 11, 2013

(54) ELASTIC JOINT BODY

(75) Inventors: Werner Waehling, Kraiburg am Inn (DE); Joachim Reihle, Schnaitsee (DE); Marc Brandl, Burgkirchen (DE); Marco Jaendl, Neuoetting (DE); Tanja Wainz, Taufkirchen (DE); Wolfgang Nindel, Muehldorf (DE); Steffen Jerye, Haag (DE); Joachim Rothe, Muehldorf (DE); Thomas Gruenwald, Muehldorf (DE)

(73) Assignee: SGF Sueddeutsche Gelenkscheilbenfabrik GmbH & Co., KG, Waldkraiburg (DE)

( * ) Notice: Subject to any disclaimer, the term of this patent is extended or adjusted under 35 U.S.C. 154(b) by 14 days.

(21) Appl. No.: 13/119,459

(22) PCT Filed: Sep. 17, 2009

(86) PCT No.: PCT/EP2009/006733
§ 371 (c)(1),
(2), (4) Date: Aug. 5, 2011

(87) PCT Pub. No.: WO2010/031564
PCT Pub. Date: Mar. 25, 2010

(65) Prior Publication Data
US 2011/0300953 A1  Dec. 8, 2011

(30) Foreign Application Priority Data

Sep. 17, 2008 (DE) .......................... 10 2008 047 596
Dec. 5, 2008 (DE) ..................... 20 2008 016 135 U (51) Int. Cl.
*F16D 3/78* (2006.01)

(52) U.S. Cl.
USPC .......................................................... 464/69

(58) Field of Classification Search
USPC ................................................ 464/69, 93–96
See application file for complete search history.

(56) References Cited

U.S. PATENT DOCUMENTS

| 4,118,952 A | * | 10/1978 | Kobayashi ...................... 464/69 |
| 4,188,802 A | | 2/1980 | Zeidler et al. |
| 4,790,794 A | * | 12/1988 | Takeda et al. ................... 464/93 |

FOREIGN PATENT DOCUMENTS

| DE | 37 34 089 | 6/1988 |
| DE | 3942432 C1 | 5/1991 |

(Continued)

OTHER PUBLICATIONS

International Search Report for Appln. No. PCT/EP2009/006733 mailed Dec. 10, 2009.

*Primary Examiner* — Gregory Binda
*Assistant Examiner* — Josh Skroupa
(74) *Attorney, Agent, or Firm* — Carter Deluca Farrell & Schmidt LLP (57) ABSTRACT

A shaft arrangement for the articulated connection of two shaft sections is provided, having a plurality of bushings which are arranged in the circumferential direction in predetermined angular distances with respect to a centre axis M of the joint body, a plurality of loop bundles, with each loop bundle looping around two neighbouring bushings and each bushing being looped around by at least two loop bundles, one of which may be subjected to a tensile load in the case of a torque transmission via the shaft sections, and the other one may be subjected to a thrust load, a support device which is arranged on at least one bushing for axially guiding the plurality of the loop bundles, and a rubber-elastic casing into which the loop bundles, the support devices and the bushings are at least partially embedded.

20 Claims, 10 Drawing Sheets

FOREIGN PATENT DOCUMENTS

| | | |
|---|---|---|
| DE | 4204973 A1 | 8/1992 |
| DE | 4304274 C1 | 3/1994 |
| DE | 19742359 A1 | 4/1999 |
| DE | 19742361 A1 | 4/1999 |
| DE | 10 2004 029989 | 1/2006 |
| DE | 102005003459 B3 | 3/2006 |
| DE | 102006001200 A1 | 8/2006 |
| EP | 1 302 686 | 4/2003 |
| EP | 1 344 954 A1 | 9/2003 |
| EP | 1 469 218 | 10/2004 |
| EP | 1 818 556 | 8/2007 |
| FR | 837 975 A | 2/1939 |
| GB | 339 560 | 12/1930 |
| JP | 6221340 A | 8/1994 |
| JP | 2000055072 * | 2/2000 |
| JP | 2000055072 A | 2/2000 |
| JP | 2003021161 A | 1/2003 |
| JP | 2006118653 * | 5/2006 |

* cited by examiner

ELASTIC JOINT BODY

TECHNICAL FIELD

The present invention relates to an elastic joint body for a shaft arrangement for the articulated connection of two shaft sections, comprising a plurality of bushings which are arranged in the circumferential direction at predetermined angular distances with respect to a centre axis of the joint body, a plurality of loop bundles, wherein each loop bundle loops around two adjoining bushes, and each bushing is looped by at least two loop bundles, one of which can be subjected to a tensile load and the other one to a thrust load in the case of torque transmission via the shaft sections, a support device which is arranged on at least one bushing for the axial guidance of the plurality of loop bundles, and a rubber-elastic casing into which the loop bundles, the support devices and the bushings are at least partially embedded.

BACKGROUND OF RELATED ART

Such joint bodies are known from the prior art and are e.g. disclosed in the of following documents.

DE 10 2004 029 989 A1 discloses a joint body with bushings wherein collar elements are provided on their axial ends respectively.

EP 1 302 686 A discloses a joint body with bushings which are connected by means of a projection with an outer bushing. The outer bushings have disc-like projections, which are formed integrally with the outer bushing.

EP 1 469 218 A shows as joint body having bushings wherein an outer bushing is arranged around these bushings. The outer bushing has our disc-shaped projections which are integrally formed with the outer bushing.

GB 339 560 A discloses a joint body with bushings which are provided with discs on their axial ends. The bushings have two projections between the loop bundles at their outer circumference.

Document DE 37 34 089 A1 describes an elastic joint body where a loop bundle which is subjected to a tensile load and at least one loop bundle which is subjected to a thrust load loop around neighbouring bushings. In the loop area or the bushings the loop bundles guided or axially supported, respectively, by coil-type collars with U-shaped cross-sections, For manufacturing the erastic joint body in accordance with DE 37 34 089 A1 . the loop bundles or yarn winds, respectively, have to be wound into the U-shape of the collars and then pressed onto the bushings Together with the collars.

In the introduction to the description, document DE 37 34 089 A1 describes an elastic joint body, upon which collars are pressed in the axial direction for the axial support oldie loop bundles. The collars have an L-shaped profile and are joined by pressing with bushing so as to be axially undisplaceable and secured against rotation. Between the individual loop bundles which loop around the bushings, support elements are pressed onto the bushings for their axial guidance or support, respectively. A portion of the support elements which is in contact with the bushing projects into the area of the bushings. onto which the loop bundles are to wound between two support elements.

In the manufacture of this joint body, the collars or support elements, respectively, are first pressed onto the bushings, and the loop bundles are subsequently wound onto the bushings. The loop bundles between the support elements must be wound in such a manner that they may surround or receive, respectively, the portions of the support elements which are in contact with the bushing.

Thus, the manufacturing process of the two above joint bodies which are known from the state of the art is relatively labour and time consuming. The loop bundles are either directly wound onto the coil-type collars and then pressed together with them onto the bushings, or the support elements have to be pressed onto the bushings first, in order to be able to subsequently insert or wind the loop bundles into the areas between two support elements. The winding machines which are employed in the manufacturing process have to be designed in such a manner that they can accommodate the coil-type collars or the bushings, in order to be able to wind the loop bundles on the bushings or the U-shaped collars, respectively. Moreover, the position of the collars is not definitely defined because tolerance-related deviations from the nominal position during the pressing operation.

It is therefore the object of the present invention to provide an elastic joint body of the initially mentioned type with a simple construction, which enables a simplification of the manufacturing process.

SUMMARY

This object is solved by an elastic joint body of the initially mentioned type, wherein the support device comprises at least two separately formed collar elements which may be attached on the bushing, one of which being in contact with the respective opposite axial ends of the loop bundle which is subjected to a tensile load, with the axial position of the collar elements relative to the bushing being predetermined in accordance with a predetermined nominal cross-section of the loop bundle to be supported, and wherein the support device includes axial inner and outer collar elements, with the inner collar elements being allocated to the loop bundle which is subjected to a tensile load, and with two loop bundles being arranged between the inner collar elements and the outer collar elements, with the axial position of the axially outer collar elements relative to the bushing being predetermined in accordance with a predetermined nominal cross-section of the loop bundles which extend between the inner and outer collar elements.

By means of using a support device with at least two separately formed collar elements which may be attached on the bushing, it becomes possible to significantly simplify and shorten the manufacturing process of the inventive elastic joint body because the loop bundles may be wound separately, i.e. without collar elements, prior to their application on the bushing, and an assembly of the elastic joint body may be carried out later. In addition, the loop bundles are supported by the support device of the inventive joint body in the circumferential area of the bushing, which during operation of the joint body, is heavily loaded, and friction effects between the loop bundles of the same materials are avoided.

Variations of the distance of the individual collar elements from each other may be minimised by previously establishing and exactly maintaining the axial position of the collar elements relative to the bushing in accordance with a predetermined nominal cross-section of the loop bundle to be supported. In other words, it may be prevented that the distance between neighbouring collar elements of elastic joint bodies of a certain batch is larger or smaller as a function of tolerances, which under operating conditions may have a substantial influence on the service life, in particular of the loop bundles which are subjected to a tensile load. Such variations may be prevented by exactly maintaining the axial position of the collar elements.

The modular construction of the support device with the inner and outer collar elements enables the winding of all loop bundles prior to the application on the bushings, and subsequently, the alternate arrangement with the collar elements on the bushing. The tensile-loaded loop bundle is first slipped on the bushing and then secured in a predetermined axial position on the bushing by the inner collar elements and in accordance with the nominal cross-section of the loop bundle. Subsequently, the two thrust-loaded axially outer loop bundles are slipped on the bushing. These two parallel loop bundles are secured by the two axially outer collar elements which form the respective ends of the support device.

According to a preferred embodiment of the invention, at least two of the axially inner and outer collar elements may be formed as collars with an L-shaped cross-section and may be attached in a nominal position on at least one of the bushings. In this context it should be noted that the L-shaped collars are formed in such a manner that their portions which are in contact with the bushing may be adapted to a nominal cross-section of the loop bundles to be supported, with two collars with their portions in contact with the bushing facing each other for supporting the tensile-loaded loop bundle and forming a support area in accordance with the nominal cross-section of the tensile-loaded loop bundle. Thus, the L-shaped collars may be positioned in such a manner that they axially support a thrust-loaded loop bundle which loops around the bushing with the portion in contact with the bushing, with in its axial extension being adapted to the nominal cross-section of the loop bundle to be supported. In the tensile-loaded loop bundle which may often be formed with an enlarged cross-section for accommodating the tensile forces during operation of the joint body, two of the L-shaped collars in contact with the bushing are positioned facing each other and form a combined coil-shaped U-shaped support area, the width of which is adapted to the nominal cross-section of the tensile-loaded loop bundle. In other words, the contacting axial portions of the L-shaped collars, which are attached on the bushing exactly define the width of the U-shaped support area, so that positional variations of the collars which may occur, for example, in the state of the art due to the pressing tolerance are essentially excluded.

According to a preferred embodiment of the invention, the outer collar elements may be formed as L-shaped collars in order to enlarge the resilient area of the loop bundles in the case of cardanic or gimballed loads, with at least one of the collars having an irregular collar height in the circumferential direction. Where the loop bundles exits the respective bushing, the collar elements may be formed with a reduced collar height so that the non-guided portion of the loop bundles between the bushings is enlarged and thus the resilient area of the loop bundles as well. This enlargement of the resilient area of the loop bundles allows a further reduction of localised loads of the threads in the circumferential area of the collars. In order to avoid a sharp edge at the above described area of the collars, a development of the invention provides for the collar, at least in portions, extends under an angle not equal to 90° relative to the centre axis of the bushings. The collar is thereby bent in the direction of the bushing end, which in the case of cardanic or gimballed loads of the joint body prevents a localised crumbling and overstretching of the loop bundles or of individual threads, respectively, of the loop bundle.

In a development of the invention it is provided that at least two of the collar elements are formed disc-shaped.

In order to be able to position the tensile-loaded loop bundle in an axially predetermined position relative to the bushing and to adapt it to the nominal cross-section of the loop bundle to be supported, a preferred embodiment of the invention provides for the axially inner collar elements to be formed disc-shaped and to cooperate with a groove in at least one bushing in a positioning manner.

According to a preferred embodiment of the invention, the axially outer collar elements may be formed disc-shaped and joined with at least one of the bushings by riveting. In this case, the axially outer disc-shaped collar elements are not pressed on the bushings but permanently engaged or riveted with the bushing.

For the formation of support areas for the loop bundles to be supported or for a mutual support in the axial direction, respectively, a development of the invention provides for least two of the collar elements to contact each other in the axial direction. It is also to be noted that the support device may include four L-shaped collars, wherein neighbouring L-shaped collars may contact one another with their portions in contact with the bushing in the axial direction.

A preferred embodiment of the invention provides the arrangement of a stop body between two neighbouring bushings and in a spaced relationship to them for a load relief and support of the loop bundles during operation of the joint body. As already mentioned above, the individual loop bundles are subjected to difference forces during the operation of the joint body. If a torque is transmitted by the joint body, the loop bundles between two bushings are loaded either with a thrust force (thrust portion) or a tensile force (tensile portion), while the rubber-elastic casing is also loaded during operation. In the thrust portion, two neighbouring bushings are caused by the load to move towards each other so that the bundles will be upset in the thrust portion. The stop bodies limit this upsetting because they form a stop for the bushings and the loop bundles, respectively, to bear against in the thrust portion. In other words, the stop bodies enable the elastic joint body to transmit higher torques or to significantly reduce the installation size with a constant torque capacity. The stop bodies also constitute an adjustment means for the joint body, because the torsional and cardanic or gimbal stiffness may be influenced by their positioning, dimensioning and contour.

Because the bushings are arranged in the circumferential direction at predetermined angular distances with respect to the centre axis of the joint body, a preferred embodiment of the invention provides for a plurality of stop bodies to be arranged at regular angular distances as well.

For the support of the loop bundles and the bushings, respectively, by the stop bodies over the entire width of the joint body in the axial direction, a development of the invention provides for the plurality of the stop bodies to at least partially penetrate the rubber-elastic casing in the axial direction of the joint body. The stop bodies penetrating the joint body generate various possibilities for the insertion of the stop bodies into the joint body which will be described in the following.

In order to achieve a manufacturing process as simple as possible for a joint body with stop bodies, according to an embodiment of the invention, the stop bodies are vulcanised into the rubber-elastic casing or pressed into recesses provided therein after the vulcanisation process. If the stop bodies are integrated by vulcanisation they may be arranged together with the bushings, the loop bundles as well as the collar elements for the axial support of the loop bundles on the bushings in a vulcanisation tool, rubber spray-coated and subsequently be fixed by vulcanisation in the joint body. If the stop bodies are alternatively pressed into the recesses of the joint body after the vulcanisation, a recess is provided in the tool according to the dimensions of the stop bodies and the joint body is vulcanised. Following the vulcanisation, the stop bodies are pressed into the corresponding recesses, with the cross-section of the recesses being designed such that the stop body elastically expands these recesses upon pressing-in and is then secured by friction against an outward displacement in the axial direction.

According to a preferred embodiment, the stop bodies have an essentially constant cross-section in the axial direction. This embodiment of the stop bodies is preferably employed if the stop bodies are vulcanised into the joint body.

As an alternative to this embodiment, it may be provided that the stop bodies have a cross-section which is tapering towards their centre. As already mentioned above, the stop bodies may also be pressed into recesses in the joint body. However, in order to prevent a displacement of the stop body in the axial direction, the tapering cross-section provides an axial locking means in the form of an engagement function or "click function" which allows the stop body to be "clicked" into the corresponding recess. In other words, the cross-section of the recesses in the joint body corresponds with the cross-section of the stop body in order to secure it against an outward displacement in the axial direction, which might be caused by the oscillations or vibrations, respectively, which occur during operation of a joint body.

Because the bushings or the loop bundles, respectively, looping around the bushings during operation of the joint body may approach the stop bodies or come into contact with them, respectively, a development of the invention provides for the stop bodies to be bulged concavely in the direction of the bushings. In other words, stop bodies are matched to the shape or radius, respectively, of the bushings and the loop bundles looping around the bushings.

According to a development of the invention, the stop bodies are made from metal, plastic or an elastically deformable material.

With respect to the manufacture of the joint body or the insertion of the stop bodies into the recesses provided in the elastic joint body, it should be mentioned that the stop bodies may be elastically stretched prior to the insertion into the respective recesses so that their cross-section may be reduced in the axial direction prior to the insertion into the recess, inserted into the respective recesses in the stretched condition, and may be released from their stretched condition after the insertion into the recess. For this purpose, stop bodies made from an elastically deformable material are used which, after stretching, essentially reassume their original cross-section.

According to a preferred embodiment of the invention the support elements are made from metal or plastic.

BRIEF DESCRIPTION OF THE DRAWINGS

In the following, the invention will be explained by way of example with reference to the accompanying figures; in which.

DETAILED DESCRIPTION

Figure 1:
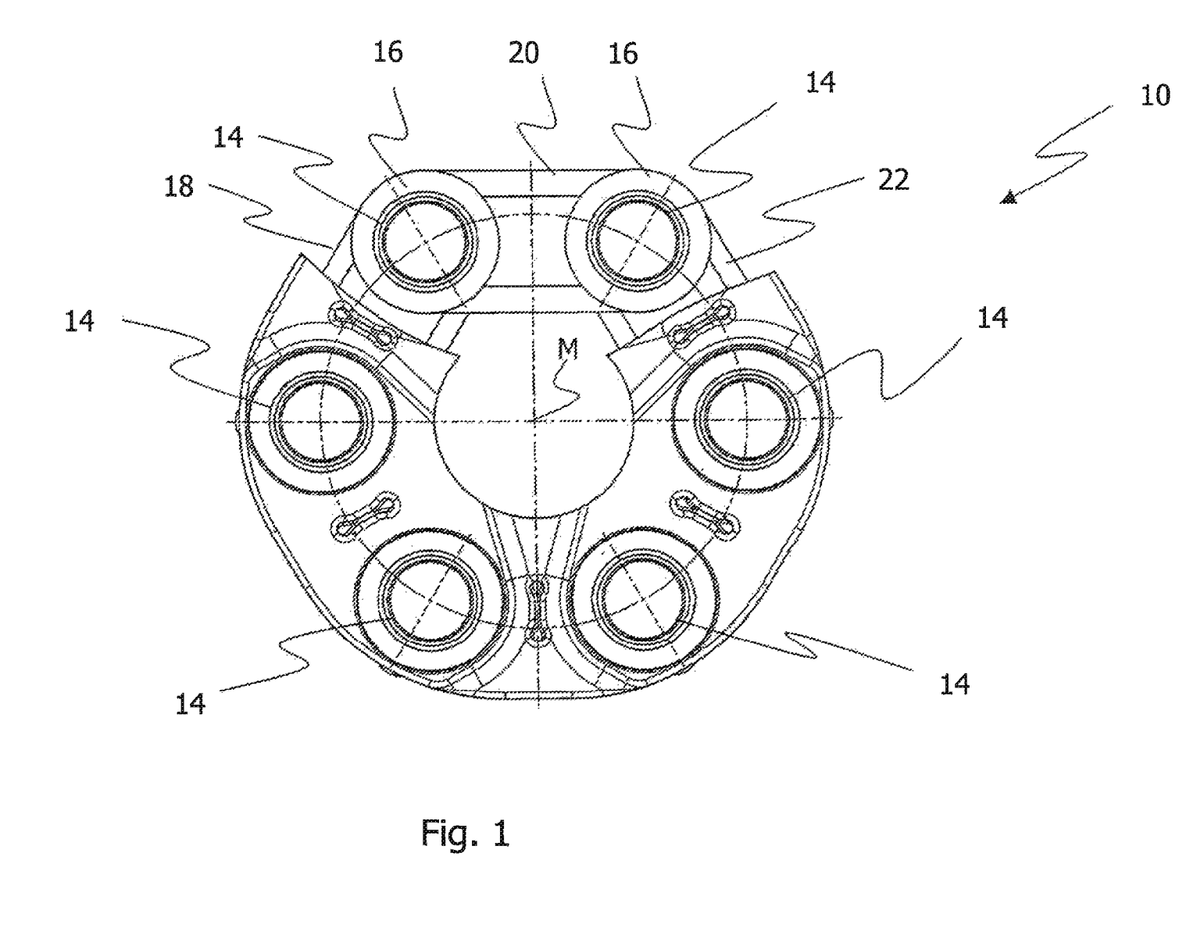
FIG. 1 shows a plan view of an inventive elastic joint body.

FIG. 1 is a partially sectioned plan view of an inventive elastic joint body 10 with six bushings 14 which are surrounded by a rubber-elastic body or casing 12. The bushings 14 are arranged in the circumferential direction with respect to a centre axis M in predetermined angular distances of the joint body 10. In the sectioned area of the joint body 10 according to FIG. 1, the collar elements 16 on the bushings 14 can be seen which are arranged for the axial support of the loop bundles 18, 20 and 22.

It can also be seen from FIG. 1 that one individual bushing 14 each is looped around by several loop bundles 18, 20 and 20, 22, respectively. It may be provided that the loop bundles 18, 22 in the installed condition of the joint body 10 in a shaft arrangement are subjected to a tensile force, while the loop bundle 20 and another parallel loop bundle (not shown in FIG. 1) which is embedded in the rubber casing 12 are subjected to pressure or thrust, respectively.

The loop bundles 18, 20, 22 and the loop bundle not shown in FIG. 1 as well as a support device for supporting them will later be described in detail with reference to the following figures.

Figure 2:
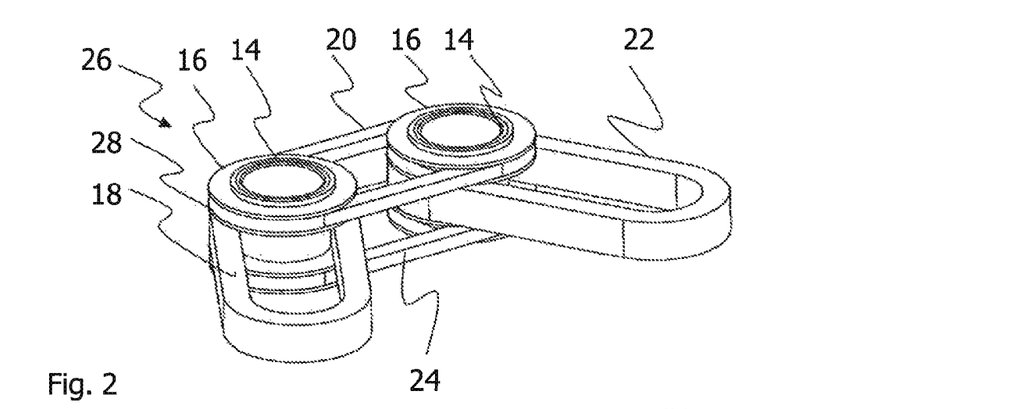
FIG. 2 a perspective view of a support device according to a first embodiment of the invention.

FIG. 2 is a perspective illustration of a support device 26 with outer collar elements 16 and with inner collar elements 28, only portions of which are shown in this figure, which is arranged at the bushings 14. FIG. 2, too, shows that the bushings 14 are looped around by several loop bundles 18, 20, 24 and 20, 22, 24, respectively. A loop bundle 18 with an enlarged cross-section, which is subjected to a tensile load, is disposed between the inner collar elements 28. Between the inner collar elements 28 and the axial outer collar elements 16 two parallel loop bundles 20, 24 are arranged on the bushing 14, which may be subjected to a thrust or tensile load, respectively.

During operation of the joint body 10, the individual loop bundles 18, 20, 22, 24 are axially supported in the heavily loaded circumferential area of the bushings 14 in the axial direction by the inner collar elements 28 and the outer collar elements 16. This allows a significant increase of the proportional carrying capacity of the individual loop bundles 18, 20, 22, 24 in this area. Moreover, the inner collar elements 28 separate the loop bundles which, in operation, are loaded by different forces—the tensile-loaded loop bundles 18, 22 and the thrust-loaded loop bundles 20, 24—from each other. The separation of the differently loaded loop bundles 18, 20, 22, 24 prevents the friction effects between the loop bundles 18, 20, 22, 24 with their negative influence on the service life, i.e. the mutual friction between the loop bundles 18, 20, 22, 24 from the same materials is excluded.

FIG. 2 shows the modular construction of the support device 26, which significantly simplifies and shortens the manufacturing process of the elastic joint body 10. The loop bundles 18, 20, 22 and 24 are separately wound prior to assembly. This allows the use of conventional winding machines because these need not accommodate the bushings 14, too, for winding the loop bundles. During assembly, the pre-manufactured loop bundles are slipped onto the bushings 14 and axially positioned by the axial portions of the collar elements 16, 28. The tensile loaded loop bundles 18, 22 are slipped onto the bushings 14 first and then axially secured on the bushing 14 by means of the inner collar elements 28 in accordance with a predetermined nominal cross-section of the tensile-loaded loop bundle 18, 22. Subsequently, the pre-manufactured, axially outer, thrust-loaded loop bundles 20, 24 are slipped onto the bushings 14 and are axially positioned by the axially outer collar elements 16, again in accordance with a predetermined nominal cross-section.

Figure 3:
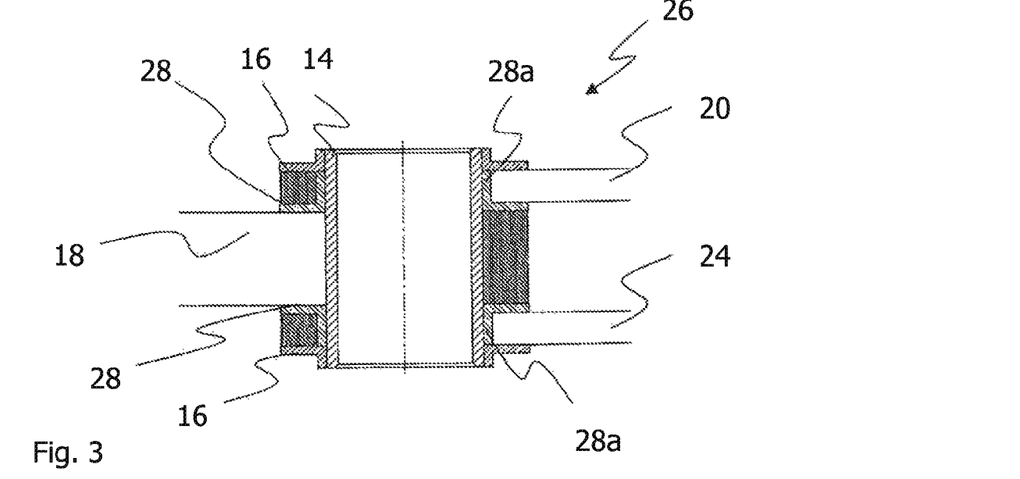
FIG. 3 a sectional view of the support device according to the first embodiment of the invention.

FIG. 3 is a sectional view of the support device 26 according to the first embodiment of the invention. According to the first embodiment, the inner collar elements 28 and the outer collar elements 16 are formed as L-shaped collars. The thrust-loaded loop bundle 18 is guided by the inner L-shaped collars 28 directly on the bushing 14 around the bushing and is axially supported by the collars 28.

As can also be seen from FIG. 3, the inner L-shaped collars 28 with their axial portions 28a which are in contact with the bushings are adapted to the nominal cross-section of the axially outer thrust-loaded loop bundles 20, 24. The loop bundles 20, 24 are thus guided around the bushings 14 by the portion 28a of the L-shaped collars 28 which are in contact with the bushings 14. The inner L-shaped collars 28 contact the outer collar elements or the L-shaped collars 16, respectively, with the portion 28a in contact with the bushings, i.e. the inner L-shaped collars 28 and the outer L-shaped collars 16 form a support area for the thrust-loaded loop bundles 20, 24.

FIG. 3 also explains the modular construction of the support device 26 for supporting the loop bundles 18, 20, 22 and 24. Due to the modular construction of the support device 26 which is formed by assembling the inner and outer collar elements 16, 28, the loop bundles 18, 20, 22, 24 may be pre-manufactured separately. When assembling the joint body 10, they are successively arranged on the bushings, together with the collar elements 16, 28 and axially secured by these in a predetermined position in accordance with the nominal cross-section of the respective loop bundles.

Figure 4:
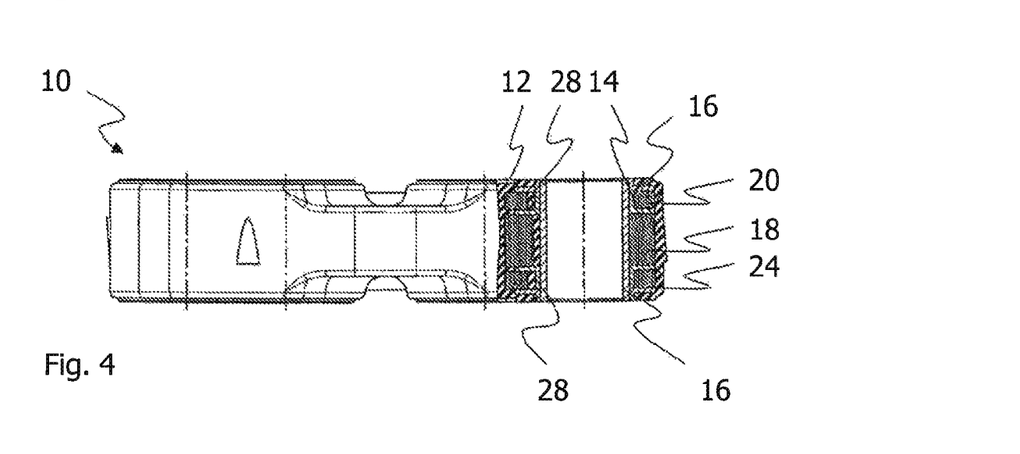
FIG. 4 a partially sectioned side view of an elastic joint body according to the first embodiment of the invention.

FIG. 4 shows a partially sectioned side view of the elastic joint body 10, with the support device 26 being visible in the sectioned area. From FIG. 4 is can be seen how the support device 26 and the inner collar elements 28 as well as the outer collar elements 16, respectively, and the individual loop bundles 18, 20, 22, 24 are embedded in the rubber-elastic casing 12.

In the following, further embodiments of the invention will be explained with reference to the remaining figures. In order to avoid repetitions and for the sake of simplification of the description, similar components with similar functions are designated the same reference numerals as in the first embodiment, however, with a consecutive prefix number.

Figure 5:
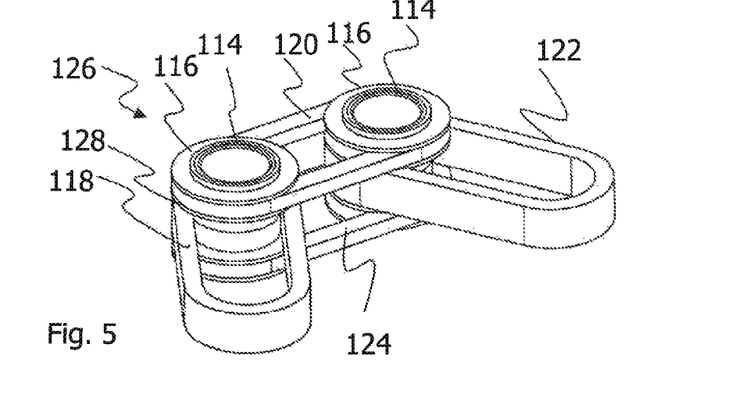
FIG. 5 a perspective partial view of a support device with loop bundles according to a second embodiment of the invention.

FIG. 5 is a perspective view of a second embodiment of the invention, comprising a support device 126 and the outer collar elements 116 and inner collar elements 128 forming it. The tensile-loaded loop bundles 118, 122 again extend between the inner collar elements 128, while the thrust-loaded loop bundles 120, 124 extend between the inner collar elements 128 and the outer L-shaped collar elements 116.

Figure 6:
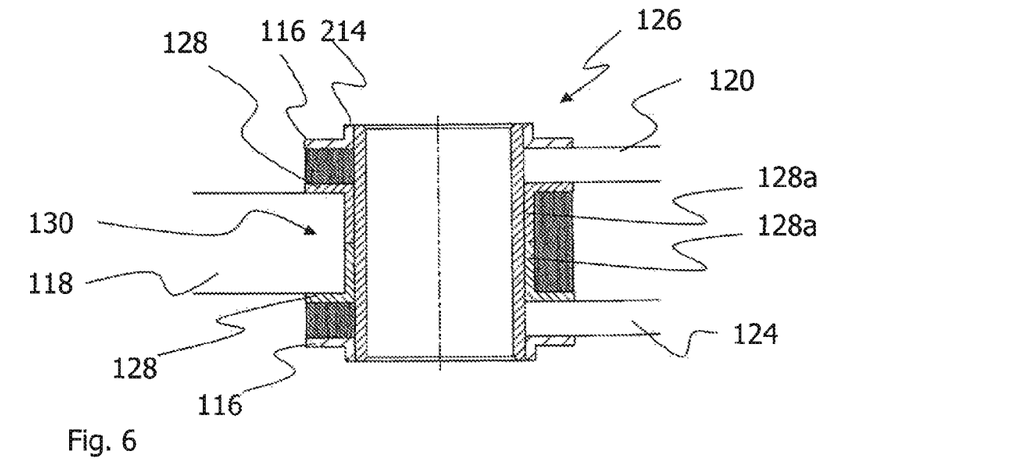
FIG. 6 a sectional view of the support device according to the second embodiment of the invention.

FIG. 6 shows a sectional view of the support device 126 which is arranged on the bushing 114. Both the inner collar elements 128 and the outer collar elements 116 are again provided in the form of collars with an L-shaped cross-section. The difference from the first embodiment which was described with reference to FIGS. 2 to 4 is that the inner L-shaped collars 128 with their portions 128a in contact with the bushings are facing each other and are in contact with each other. The inner L-shaped collars 128 form a support area 130 for the tensile-loaded loop bundle 118 which compared to the thrust-loaded loop bundles 120, 124 is provided with an enlarged cross-section. The loop bundle 118 is positioned on the bushing 114 and guided around it or axially supported, respectively, by the support area 130 which is formed by the inner L-shaped collars and whose axial width is in accordance with a predetermined nominal cross-section of the loop bundle 118. According to the second embodiment, the two axially outer thrust-loaded loop bundles 120 extend between the inner collar elements 128 and the outer L-shaped collars 116 directly on the bushing 114 are guided around it or supported, respectively.

Figure 7:
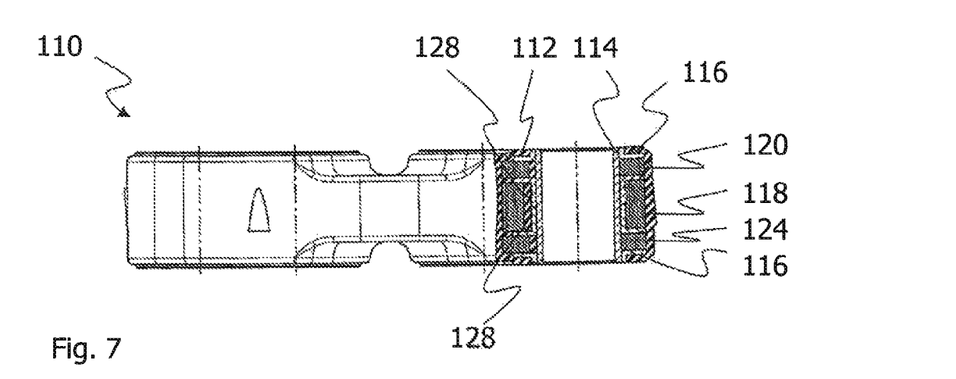
FIG. 7 a partially sectioned side view of an elastic joint body according to the second embodiment of the invention.

FIG. 7 also shows a partially sectioned view of the elastic joint body 110. Again, it can be seen how the support device 126 in the elastic joint body 110 is embedded in the rubber-elastic casing 112.

Figure 8:
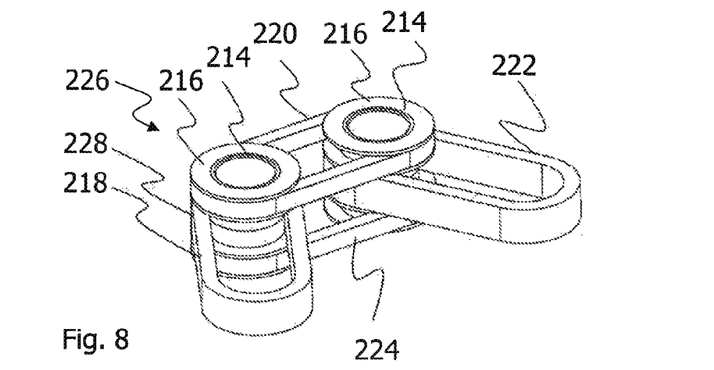
FIG. 8 a perspective partial view of a support arrangement with loop bundles according to a third embodiment of the invention.

FIG. 8 shows a perspective view of the support device 226 according to a third embodiment of the invention. As can already be seen from this view, the present embodiment differs from the embodiments described with reference to FIGS. 5 to 7 only in that the outer collar elements 216 with their L-shaped collar do not face axially outwards in the direction of the bushing end. This becomes apparent and will be and explained in detail with reference to FIGS. 9 and 10.

Figure 9:
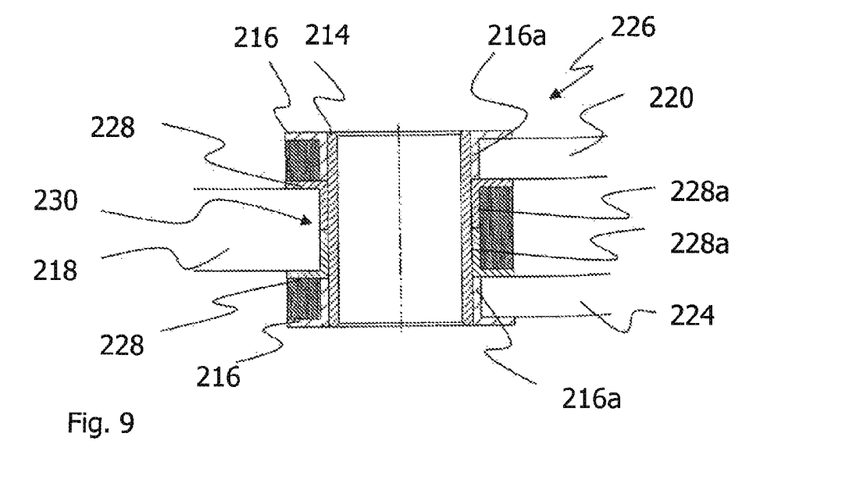
FIG. 9 a sectional view of the support device according to the third embodiment of the invention.

FIG. 9 shows a sectional view of the support device 226 according to the third embodiment of the invention. As in the above described second embodiment, the inner L-shaped collars 228 with their portions 228a in contact with the bushings 214 form a support area 230 for the tensile-loaded loop bundle 218, i.e. the two inner L-shaped collars 228 with their areas 228a in contact with the bushings 214 are facing each other. The support area 230 is designed in accordance with the nominal cross-section of the thrust-loaded loop bundle 218.

Furthermore, the difference from the previously described embodiments will become apparent from FIG. 9. The outer collar elements or the L-shaped collars 216, respectively, with their portion 216a—in contrast to the previously described embodiments clearly enlarged—which is in contact with the bushings 214 are not longer directed in the direction of the bushing end of the bushings 214 but inwards in the direction of the inner collar elements 228. The outer L-shaped collars 216 contact the inner collar elements 128 with the portion which is in contact with the bushings. The axially outer thrust-loaded loop bundles 222, 224 are guided by a support area which is formed between the inner collar elements 228 and the outer L-shaped collars 216. Thus, the outer L-shaped collars 216 comprise a portion 216a which is in contact with the bushings and which, being adapted to the nominal cross-section of the loop bundles 220, 224, defines the axial width of the guide area, which guides the loop bundles 220, 224 around the bushings.

Figure 10:
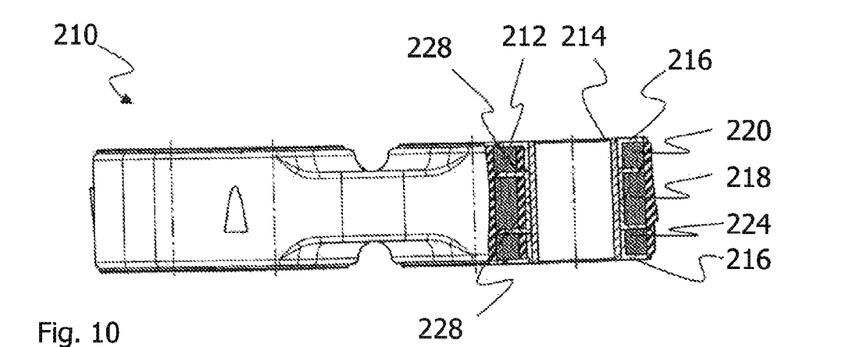
FIG. 10 a partially sectioned side view of an elastic joint body according to the third embodiment of the invention.

FIG. 10 is another partially sectioned side view of the elastic joint body 210 with the support device 216 which is embedded in the rubber-elastic casing 212.

Figure 11:
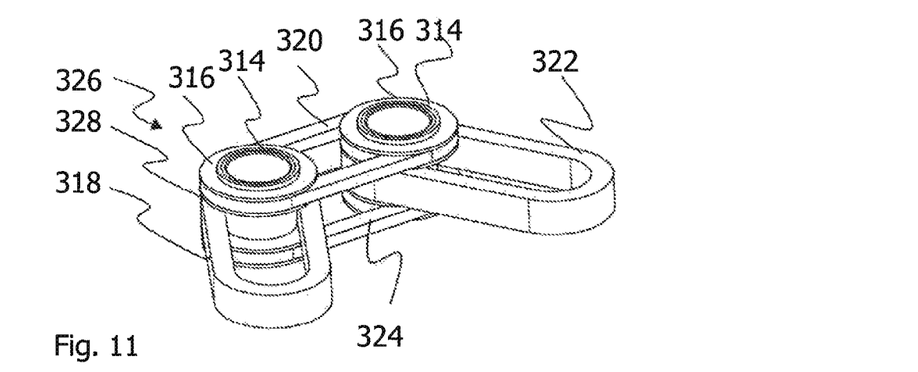
FIG. 11 a perspective partial view of a support device with loop bundles according to a fourth embodiment of the invention.

FIG. 11 shows a perspective view according to a fourth embodiment of the invention, which again depicts the support device 326 with the loop bundles 318, 320, 322, 324 supported by it. According to this embodiment, the outer collar elements 316 are again L-shaped collars 316 which are directed outwardly in the direction of the bushing end.

Figure 12:
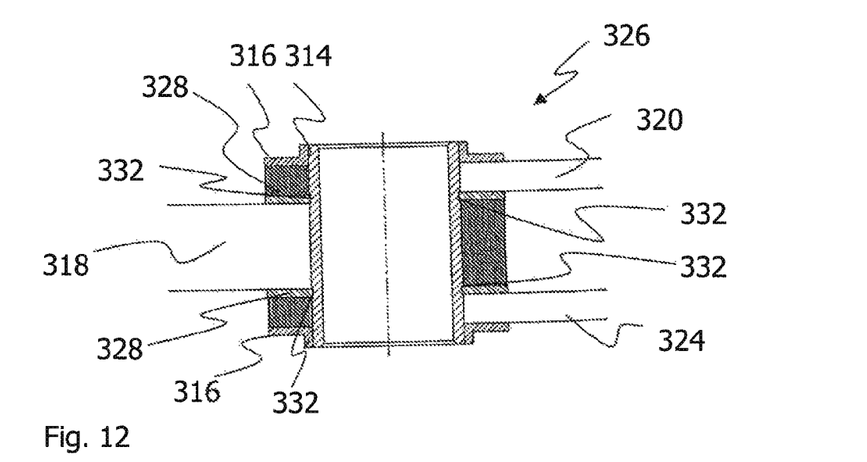
FIG. 12 a sectional view of the support device according to the fourth embodiment of the invention.

FIG. 12 is a sectional view of the support device 326 according to the fourth embodiment of the invention. The outer collar elements 316 are L-shaped collars which are directed axially outward towards the bushing end of the bushing 314.

From FIG. 12, it can also be seen that the inner collar elements 328 have a disc shape and cooperate with a groove 332 formed in the bushing 314 in a positioning manner. The grooves 332 in the bushing 314 are formed in accordance with a nominal cross-section of the tensile-loaded loop bundle 318, and after the arrangement of the loop bundle 318 the disc-shaped collar elements 328 are slipped onto the bushings 314 until they engage the groove 332 in the bushing 314 and so axially position the loop bundle 318. The loop bundle 318 is guided on a bushing portion between the two inner disc-shaped collar elements 328. Between the inner collar elements 328 and the outer collar-shaped elements the axially outer loop bundles 320, 324 which are also mounted directly on the bushing 314 are looped around it.

Figure 13:
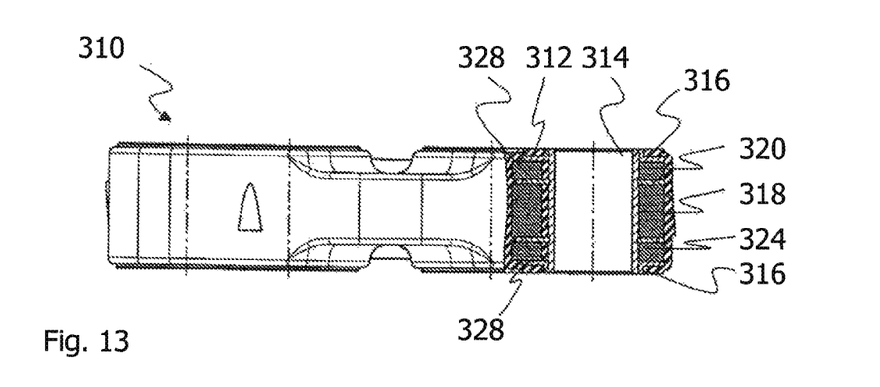
FIG. 13 a partially sectioned side view of an elastic joint body according to the fourth embodiment of the invention.

FIG. 13 shows a partially sectioned side view of the elastic joint body 310 with a support device 326 which is embedded in the rubber-elastic casing 312.

Figure 14:
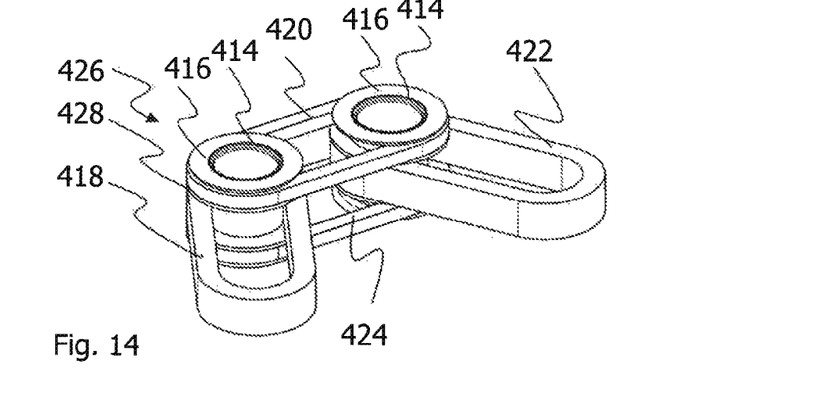
FIG. 14 a perspective partial view of a support device with loop bundles according to a fifth embodiment of the invention.

FIG. 14 is a perspective view of the support device 426 with the loop bundles 418, 420, 422, 424 supported by it. According to this embodiment, the outer collar elements 416 are disc-shaped.

Figure 15:
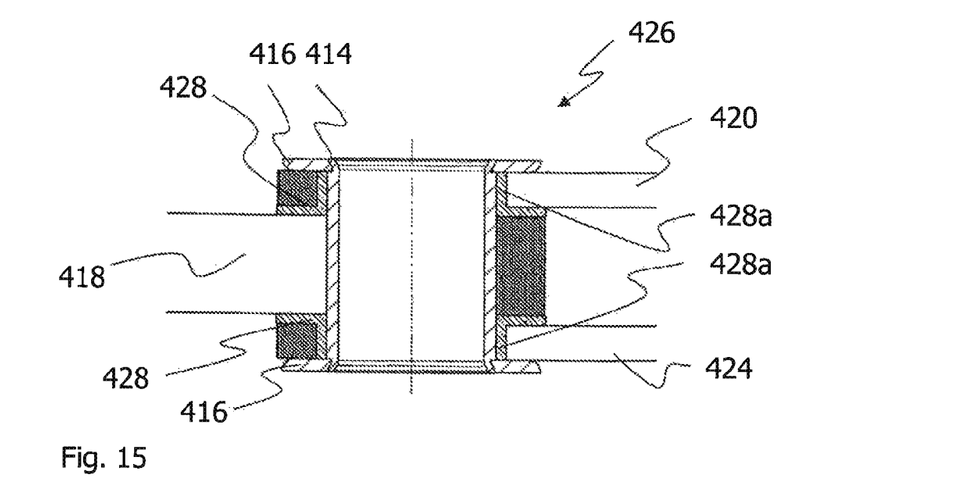
FIG. 15 a sectional view of the support device according to the fifth embodiment of the invention.

FIG. 15 shows a sectional view of the support device 426 according to a fifth embodiment of the invention. The outer disc-shaped collar elements 416 are permanently joined with the bushing 414 by riveting. The inner collar elements 428 contact the outer disc-shaped collar elements 416 with the portion 428a which is in contact with the bushings. In this embodiment the portion 428a of the inner collar elements 428 is adapted to the nominal cross-section of the axially outer thrust-loaded loop bundles 420, 424. The outer collar elements 416 and the inner collar elements 428 with the portion 428a which is in contact with the bushings 414 form a support area for the thrust-loaded loop bundles 420 and 424. The tensile-loaded loop bundle 418 is guided between the inner collar elements 428 directly on the bushing 414 around the bushing and supported.

Figure 16:
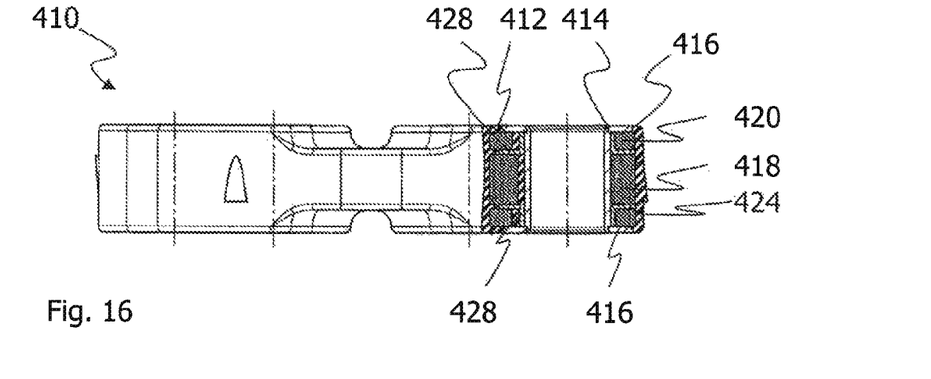
FIG. 16 a partially sectioned side view of an elastic joint body according to the fifth embodiment of the invention.

FIG. 16 shows another partially sectioned side view of the elastic joint body 410 with the support device 426 which, according to this embodiment, is only partially embedded in the rubber-elastic casing 412. In contrast to the above described embodiments, the outer disc-shaped collar elements 416 are not completely embedded in rubber-elastic casing or encased, respectively, but may be joined to the rubber-elastic casing, if desired.

Figure 17:
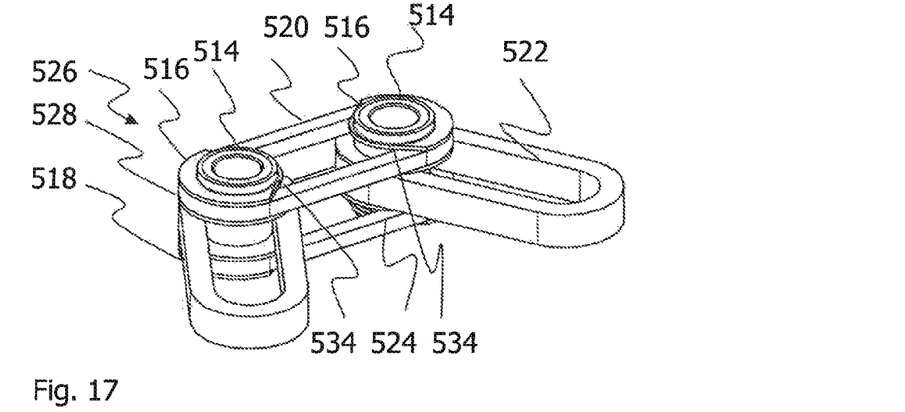
FIG. 17 a perspective partial view of a support device with loop bundles according to a sixth embodiment of the invention.

FIG. 17 is a perspective view of the support device 526 and the loop bundles 518, 520, 522 and 524 which are supported by this support device 526.

From FIG. 17 it is clearly discernible that portions of the outer collar elements 516 deviate from the continuous L-shaped collar shape. The portion 534, for example, of the collars 516 in the direction of the immediately neighbouring bushing 514 which is looped around by the thrust-loaded loop bundles 520, 524 is much shorter. In addition, this portion 534 of the collar is inclined axially upwards in the direction of the bushing end. By this configuration of the outer collar elements 516, the resilient area of the thrust-loaded loop bundles 520, 524 is significantly enlarged. In the case of cardanic loads, the loop bundles 520 and 524 can therefore accommodate bending or stretching loads, respectively, in a larger area, which has a positive influence on the life of the thrust-loaded loop bundles 520, 524 and of the joint body 510, respectively. The bend of the collars 516 in the portion 534, which extend under an angle not equal to 90° relative to the axis of the bushings (not shown), enables under load a smooth "transition" of the thrust-loaded loop bundles at the bushing 514 with the collars 516, because a sharp edge in this portion 534 is avoided, where the loop bundles 520, 524 may be worn by the cardanic loads.

Figure 18:
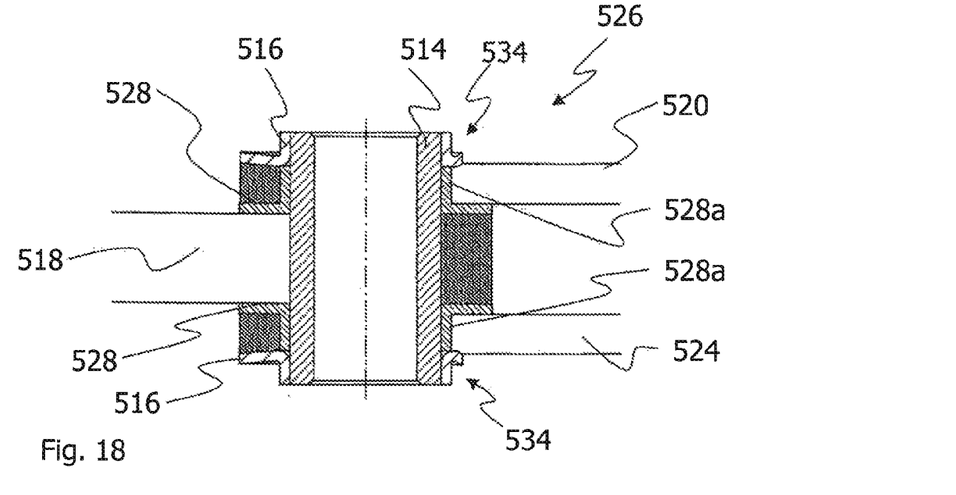
FIG. 18 a sectional view of the support device according to the sixth embodiment of the invention.

FIG. 18 depicts a sectional view of the support device 526 according to a sixth embodiment of the invention. FIG. 18 clearly shows that the portion 534 of the outer collars 516, which guides the thrust-loaded loop bundles 520, 524 in the direction of the immediately neighbouring bushing, is designed with a significantly shorter length. According to this sixth embodiment, the inner collar elements 528 are again formed as L-shaped collars and contact the outer collar elements with their portions 528a which are in contact with the bushings 514. Thus, the outer collar elements 516 and the inner collar elements 528 with their portions 528a in contact with the bushings form a support area between them for the thrust-loaded loop bundles 520, 524.

Figure 19:
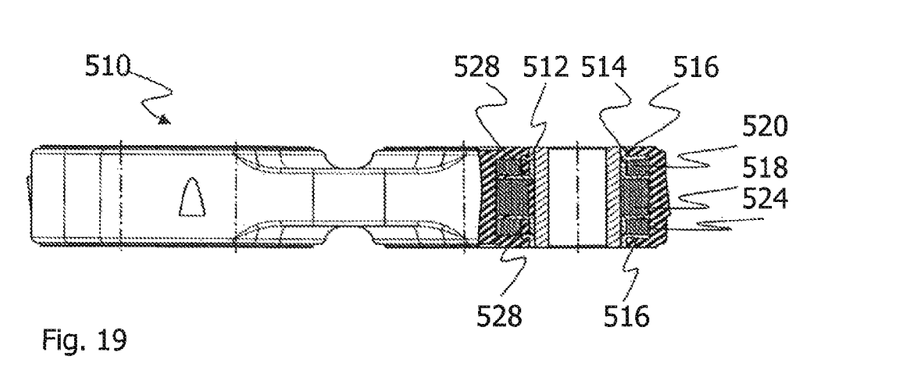
FIG. 19 a partially sectioned side view of an elastic joint body according to the sixth embodiment of the invention.

FIG. 19 shows another partially sectioned side view of the joint body 510 with the support device 526 which is embedded in the rubber-elastic casing 512.

Figure 20:
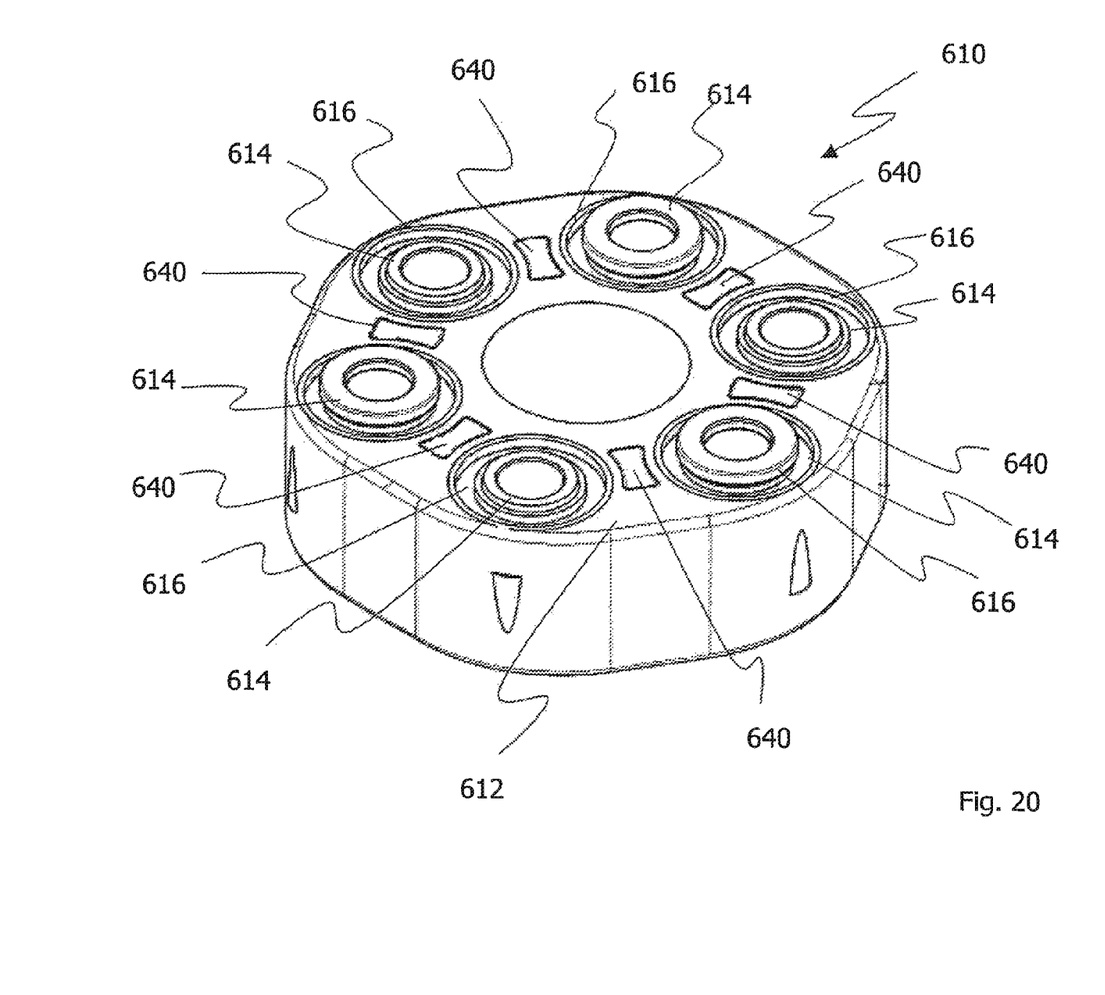
FIG. 20 a perspective view of an elastic joint body according to a seventh embodiment of the invention.

FIG. 20 is a perspective view of a seventh embodiment of the elastic joint body 610 according to the invention. It can be seen in FIG. 20 that stop bodies 640 are arranged between the bushings 614 with the collar elements 616 for load relief and support of the loop bundles. The stop bodies 640 are arranged in regular angular distances and spaced from the bushings 614. From FIG. 20 is can also be seen that the stop bodies 640 extend through the entire joint body up to the surface of the rubber-elastic casing 612.

Figure 21:
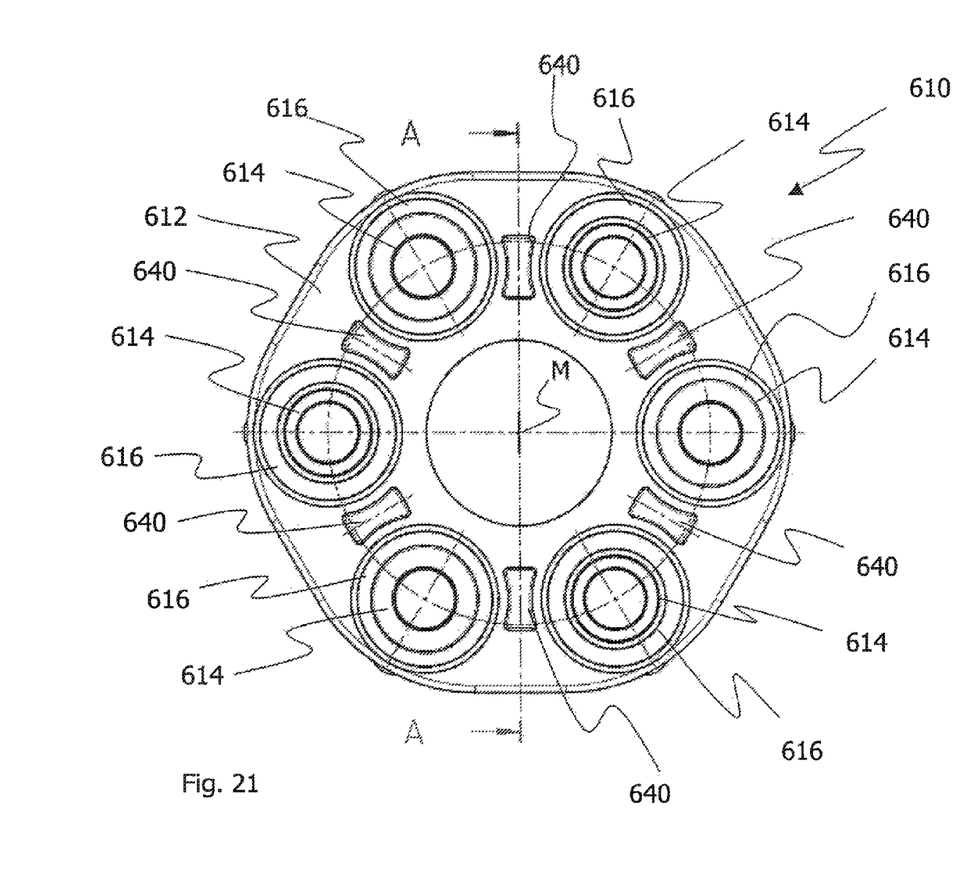
FIG. 21 a front view of a joint body according to the seventh embodiment of the invention.

FIG. 21 is a front view of the joint body 610 with the stop bodies 640. The stop bodies 640 limit a movement of the bushings 614 relative to each other in the load case. In the load case, the tensile-loaded loop bundles (not shown here) are stretched and the pressure-loaded loop bundles are upset. This upsetting or stretching, respectively, is limited by the stop bodies 640 because the bushings 614 bear against the stop bodies 640.

During operation, the elastic joint body 610 is alternately attached in a known manner at shaft sections to be connected. As already repeatedly mentioned above, the die loop bundles are loaded by different forces. If a torque is transmitted by the joint body 610 the loop bundles (not shown here) between two bushings 614 are either thrust-loaded (thrust portion) or tensile-loaded (tensile portion), and the rubber-elastic casing 612 is loaded as well during operation. In the thrust portion, two neighbouring bushings 614 approach each other due to the stress imposed by torque transmission, which causes the loop bundles in the thrust portion to be upset (compressed). In the tensile portion, the loop bundles are stretched during torque transmission. The stop bodies 640 limit stretching or upsetting, respectively, because they constitute some kind of a stop for the bushings 614 and the loop bundles, respectively, to bear against. This increases the torque capacity or, alternatively, the installation size of the elastic joint body may be reduced with a constant torque capacity. Alternatively, the installation size of the elastic joint body 610 may be reduced while maintaining a constant torque capacity.

The stop bodies 640 are of such a construction and arranged in the joint body 610 which they at least partially penetrate such that a favourable surface pressure between the stop bodies 640 and the bushings 614 and the loop bundles, respectively, is obtained. This enables to distribute stress peaks in the loop bundles (not shown here) in the joint body 610 and the mechanical loads which occur during operation more evenly in the joint body.

FIG. 21 clearly shows the concave bulge of the stop bodies 640. The curvature radius of the stop bodies 640 is adapted to the radius of the collar elements 616 or of the bushings 614, respectively.

As can be seen from FIGS. 20 and 21, in particular, the collar elements 616 have a U-shaped cross-section. However, collar elements 616 with an L-shaped collar or disc-shaped collar elements 616 may be used, because the shape of the collar elements does not influence the function of the invention.

Figure 22:
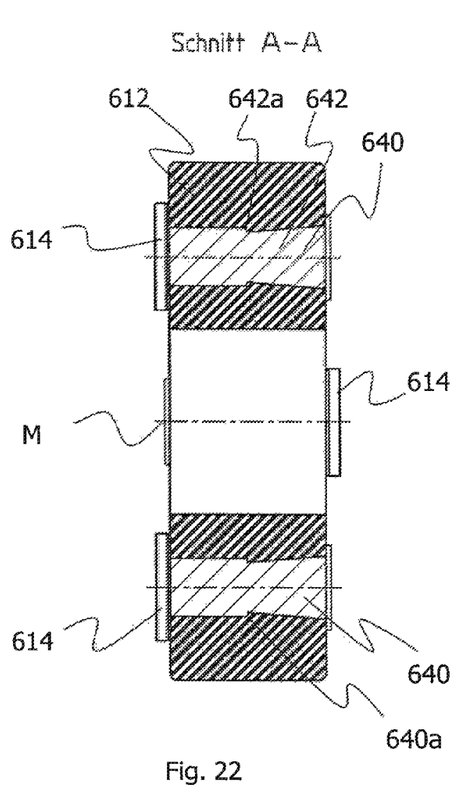
FIG. 22 a side view of a joint body according to the seventh embodiment of the invention.

FIG. 22 is a sectional view along line A-A from FIG. 21. FIG. 22 shows the cross-section of the stop bodies 640 which are accommodated in the rubber-elastic casing 612. In order to prevent the displacement out of the rubber-elastic casing 612, the stop bodies 640 (in the axial direction, from the right in FIG. 22) have a cross-section which is tapering towards the centre, so that the coated stop body 640 may be received in the rubber-elastic casing 612 or clicked-in later.

If the stop body 640 is clicked into the joint body 610, corresponding recesses 642 are provided in the rubber-elastic casing 612 in the joint body 610 during coating or vulcanising, respectively. In other words, the recess 642 has a conical cross-section which is tapering from one side—in FIG. 3 from the right side—towards the centre in the axial direction of the bushings 614, with an edge 642a being provided after the conical shape, after which the recess 642 continues with an essentially constant cross-section. The stop body 640 has a corresponding cross-section which tapers from the right to the centre and, after a step 640a, continues with a constant diameter. The stop bodies 640 may be inserted or "clicked-in", respectively, into the recesses 642 through the tapering cross-section with the step 640a at the stop body 640 or the edge 642a, respectively, in the recess 642, and be thereby secured against a displacement in the axial direction. For the axial locking of the stop bodies 640 in one of the recesses 642, various possibilities are conceivable, the preferred variants being frictional engagement or positive connection variants.

Various materials may be used for the stop bodies 640, such as plastic, metal or elastically deformable materials.

If an elastically deformable material is selected for the stop bodies 640, which is pressed into a corresponding recess 642 in the rubber-elastic casing 612 only after vulcanisation, the stop body 640 is stretched prior to the insertion into the respective recess 642, by which its cross-section is reduced in the axial direction. Then, the stop body 640 in the stretched condition, i.e. with the reduced cross-section, is inserted into the corresponding recess 642. After the insertion into the corresponding recess 642 and upon reaching the predetermined position in the recess 642, the stop body 640 is released from its stretched condition, so that it relaxes and thereby increases its cross-section and is actually "press fitted" into the recess 642.

Different materials, contours or positions as well are conceivable for the stop bodies 640, by which additional accommodation possibilities for the joint body 610 are created. The joint body 610 can thus be more flexibly adapted to its various applications, i.e. to differently dimensioned drive trains in various vehicles or to different torque capacities. Moreover, the behaviour in the case of cardanic loads may be influenced by the stop bodies 640 because the stiffness of the joint body 610 has to taken into consideration as well.

FIG. 22 also shows that the bushings 614 have alternately thickened end portions via which they may be connected with the shaft sections (not shown) of a shaft arrangement.

Figure 23:
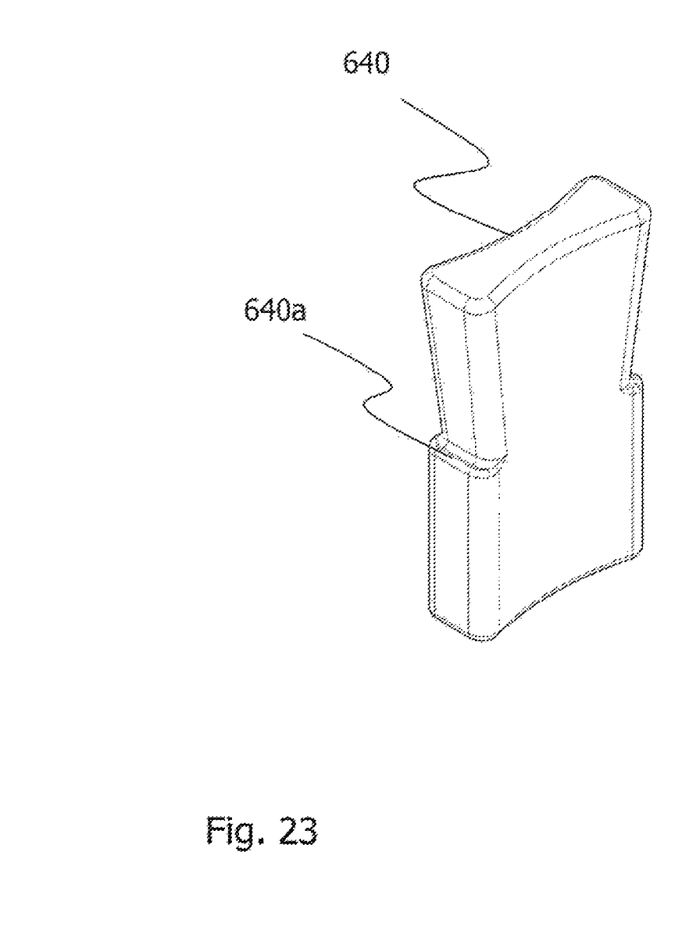
FIG. 23 a perspective view of a stop body according to the seventh embodiment of the invention.
Figure 24:
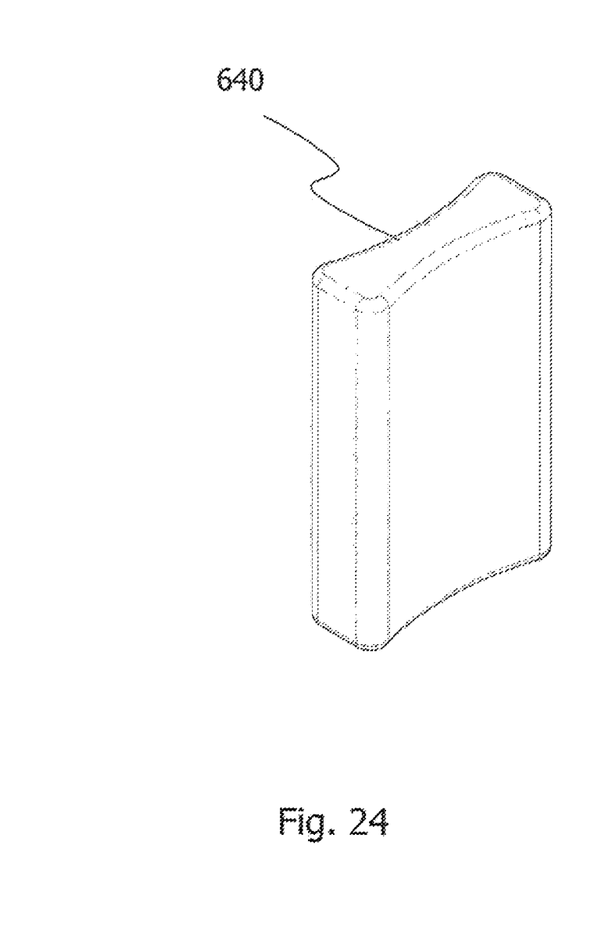
FIG. 24 a perspective view of a stop body according to the seventh embodiment of the invention.

FIGS. 23 and 24 are perspective views of the stop bodies 640. From

FIGS. 23 and 24, the concave shape of the stop bodies 640 can be seen, which matches the outer contour of the bushings 614 and the collar elements 616, respectively, with loop bundles.

FIG. 24 again shows the stop body 640 which is machined with an undercut and the step 640a.

The previously described embodiments of the invention enable a modular construction of the joint body with a combinable support device which allows the pre-manufacture of the loop bundles which may then be alternately arranged with the collar elements on the bushing and secured on the bushings in a predetermined axial position in accordance with a nominal cross-section of the loop bundles.

The invention claimed is:

1. An elastic joint body for a shaft arrangement for the articulated connection of two shaft sections, comprising:
   a plurality of bushings which are arranged in the circumferential direction in predetermined angular distances with respect to a centre axis of the joint body,
   a plurality of loop bundles, with each loop bundle looping around two neighbouring bushings and each bushing being looped around by at least two loop bundles, one of which may be subjected to a tensile load in the case of a torque transmission via the shaft sections, and the other one may be subjected to a thrust load,
   a support device which is arranged on at least one bushing for axially guiding the plurality of the loop bundles, and
   a rubber-elastic casing into which the loop bundles, the support devices and the bushings are at least partially embedded,
   wherein the support device is formed by assembling at least two separately formed inner collar elements attached on the bushing and at least two outer collar elements separately formed from the inner collar elements and separately formed from each other, the at least two outer collar elements are attached on the bushing, wherein the inner collar elements being allocated to the tensile-loaded loop bundle and one of the inner collar elements being in contact with one of the opposite axial ends of the tensile-loaded loop bundle and two loop bundles being arranged between the inner collar elements and the outer collar elements, wherein the inner collar elements and the outer collar elements are configured such that the axial position of the collar elements is settable on the bushing in accordance with a predetermined nominal cross-section of the loop bundle to be supported.

2. The joint body according to claim 1, wherein at least two of the axially inner and outer collar elements are formed as collars with an L-shaped cross-section and are attached on at least one of the bushings in a nominal position.

3. The joint body according to claim 2, wherein the L-shaped collars are formed in such a manner that the portion which is in contact with the bushing is adapted to the nominal cross-section of the loop bundles to be supported, wherein for the support of the tensile-loaded loop bundle two collars with their portions which are in contact with the bushing face each other and form a support area in accordance with the nominal cross-sections of the tensile-loaded loop bundle.

4. The joint body according to claim 2, wherein the outer collar elements are formed as L-shaped collars, with at least one of the collars having an irregular collar height in the circumferential direction.

5. The joint body according to claim 4, wherein the collar at least in portions extends under an angle not equal to 90° relative to the centre axis.

6. The joint body according to claim 1, wherein at least two of the collar elements are formed disc-shaped.

7. The joint body according to claim 6, wherein the axially inner collar elements are formed disc-shaped and cooperate with a groove in at least one bushing in a positioning manner.

8. The joint body according to claim 7, wherein the axially outer collar elements are formed disc-shaped and are connected with at least one of the bushings by riveting.

9. The joint body according to claim 1, wherein at least two of the collar elements contact each other in the axial direction.

10. The joint body according to claim 1, wherein the support device comprises four L-shaped collars, with neighbouring L-shaped collars being in contact with each other in the axial direction.

11. The joint body according to claim 1, wherein a stop body is arranged between two neighbouring bushings in a spaced relationship from them.

12. The joint body according to claim 11, wherein the plurality of stop bodies is arranged at regular angular distances.

13. The joint body according to claim 11, wherein the plurality of the stop bodies at least partially penetrates the rubber-elastic casing in the axial direction of the joint body.

14. The joint body according to claim 11, wherein the stop bodies are vulcanised into the rubber-elastic casing or pressed into recesses provided therein after the vulcanisation.

15. The joint body according to claim 14, wherein the stop bodies may elastically be stretched prior to the insertion into the respective recess, so that their cross-section may be reduced in the axial direction, that they may be inserted into the respective recess on the stretched condition and that they are releasable from the stretched condition after the insertion into the recess.

16. The joint body according to claim 11, wherein the stop bodies have an essentially constant cross-section in the axial direction.

17. The joint body according to claim 11, wherein the stop bodies have a cross-section which tapers towards their centre.

18. The joint body according to claim 11, wherein the stop bodies are bulged concavely in the direction of the bushings.

19. The joint body according to claim 11, wherein the stop bodies are made from metal, plastic or an elastically deformable material.

20. The joint body according to claim 1, wherein the collar elements are made from metal or plastic.

* * * * *

UNITED STATES PATENT AND TRADEMARK OFFICE
CERTIFICATE OF CORRECTION

PATENT NO.        : 8,460,113 B2
APPLICATION NO.   : 13/119459
DATED             : June 11, 2013
INVENTOR(S)       : Waehling et al.

It is certified that error appears in the above-identified patent and that said Letters Patent is hereby corrected as shown below:

On the Title Page, item (73) please change a portion of the Assignee's name from:

"Gelenkscheilbenfabrik" to -- Gelenkscheibenfabrik --

Signed and Sealed this
First Day of October, 2013

Teresa Stanek Rea
*Deputy Director of the United States Patent and Trademark Office*